United States Patent
Wittl

(10) Patent No.: US 10,926,652 B2
(45) Date of Patent: Feb. 23, 2021

(54) METHOD FOR AUTOMATIC UNLOCKING OF A CHARGING ARRANGEMENT AND MOTOR VEHICLE

(71) Applicant: AUDI AG, Ingolstadt (DE)

(72) Inventor: Tobias Wittl, Manching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/108,375

(22) Filed: Aug. 22, 2018

(65) Prior Publication Data

US 2019/0210468 A1   Jul. 11, 2019

(30) Foreign Application Priority Data

Jan. 10, 2018  (DE) ...................... 10 2018 200 256.8
May 9, 2018   (DE) ...................... 10 2018 207 219.1

(51) Int. Cl.
  *B60L 53/31*   (2019.01)
  *B60L 53/16*   (2019.01)
  *H02J 7/04*    (2006.01)

(52) U.S. Cl.
  CPC ............... *B60L 53/16* (2019.02); *B60L 53/31* (2019.02); *H02J 7/045* (2013.01); *B60L 2230/12* (2013.01); *B60L 2270/32* (2013.01)

(58) Field of Classification Search
  CPC ...... B60L 53/16; B60L 53/31; B60L 2270/32; B60L 2230/12; H02J 7/045; H02J 7/0027;
  (Continued)

(56) References Cited

U.S. PATENT DOCUMENTS

| 8,900,006 B2 * | 12/2014 | Gaul | B60L 53/65 439/489 |
| 2011/0066515 A1 * | 3/2011 | Horvath | G06Q 20/204 705/17 |

(Continued)

FOREIGN PATENT DOCUMENTS

| DE | 102010011162 A1 | 2/2011 |
| DE | 10 2009 039 651 A1 | 3/2011 |

(Continued)

OTHER PUBLICATIONS

European Search Report dated Feb. 18, 2019, in connection with corresponding EP Application No. 18185797.0 (10 pgs., including machine-generated English translation).

(Continued)

*Primary Examiner* — Drew A Dunn
*Assistant Examiner* — Sailesh Thapa
(74) *Attorney, Agent, or Firm* — Maier & Maier, PLLC

(57) ABSTRACT

A method for the automatic unlocking of a charging arrangement, in which an electrically drivable motor vehicle is connected to a charging station. In this case, an automatic unlocking of a mechanical connection between the charging station and the motor vehicle occurs as soon as a predetermined state of charge has been reached for a battery of the motor vehicle. Beyond this, an unlocking signal is generated by the motor vehicle as soon as the mechanical connection has been unlocked. Subsequently, the generated unlocking signal is transmitted to the charging station, which, in consequence thereof, signals that the charging station is available.

15 Claims, 1 Drawing Sheet

(58) Field of Classification Search
CPC ............... H02J 7/0042; H02J 2007/005; H02J 2007/0049; H02J 7/0077; H02J 7/00712; H02J 2310/48; H02J 7/0049; H02J 7/0048; Y02T 90/12; Y02T 10/7072; Y02T 90/14; Y02T 10/70; Y02T 90/16
See application file for complete search history.

(56) References Cited

U.S. PATENT DOCUMENTS

| | | | | |
|---|---|---|---|---|
| 2012/0112697 | A1* | 5/2012 | Heuer | B60L 11/1818 320/109 |
| 2013/0057210 | A1* | 3/2013 | Nergaard | B60L 53/63 320/109 |
| 2013/0110296 | A1* | 5/2013 | Khoo | G06F 1/26 700/286 |
| 2013/0338824 | A1* | 12/2013 | Becker | B60L 53/31 700/237 |
| 2014/0232338 | A1* | 8/2014 | Fontana | B60L 11/1824 320/109 |
| 2016/0031338 | A1* | 2/2016 | Penilla | B60L 58/21 320/109 |
| 2016/0352113 | A1* | 12/2016 | Zhao | B25J 5/02 |
| 2016/0358472 | A1* | 12/2016 | Bezak | B60L 53/60 |

FOREIGN PATENT DOCUMENTS

| | | |
|---|---|---|
| DE | 10 2011 010 809 A1 | 8/2012 |
| DE | 10 2013 015 954 A1 | 4/2014 |
| DE | 10 2014 102 210 A1 | 8/2014 |
| DE | 10 2014 226 755 A1 | 6/2016 |
| EP | 2 774 799 A1 | 9/2014 |
| EP | 2 826 660 A1 | 1/2015 |

OTHER PUBLICATIONS

Examination Report dated Jul. 5, 2018 of corresponding German application No. 10 2018 207 219.1; 5 pgs.
Examination Report dated Mar. 6, 2020 in corresponding European Application No. 18 185 797.0; 10 pages including partial machine-generated English-language translation.
Examination Report dated May 8, 2020 in corresponding European Application No. 18 185 797.0; 8 pages including partial machine-generated English-language translation.

* cited by examiner

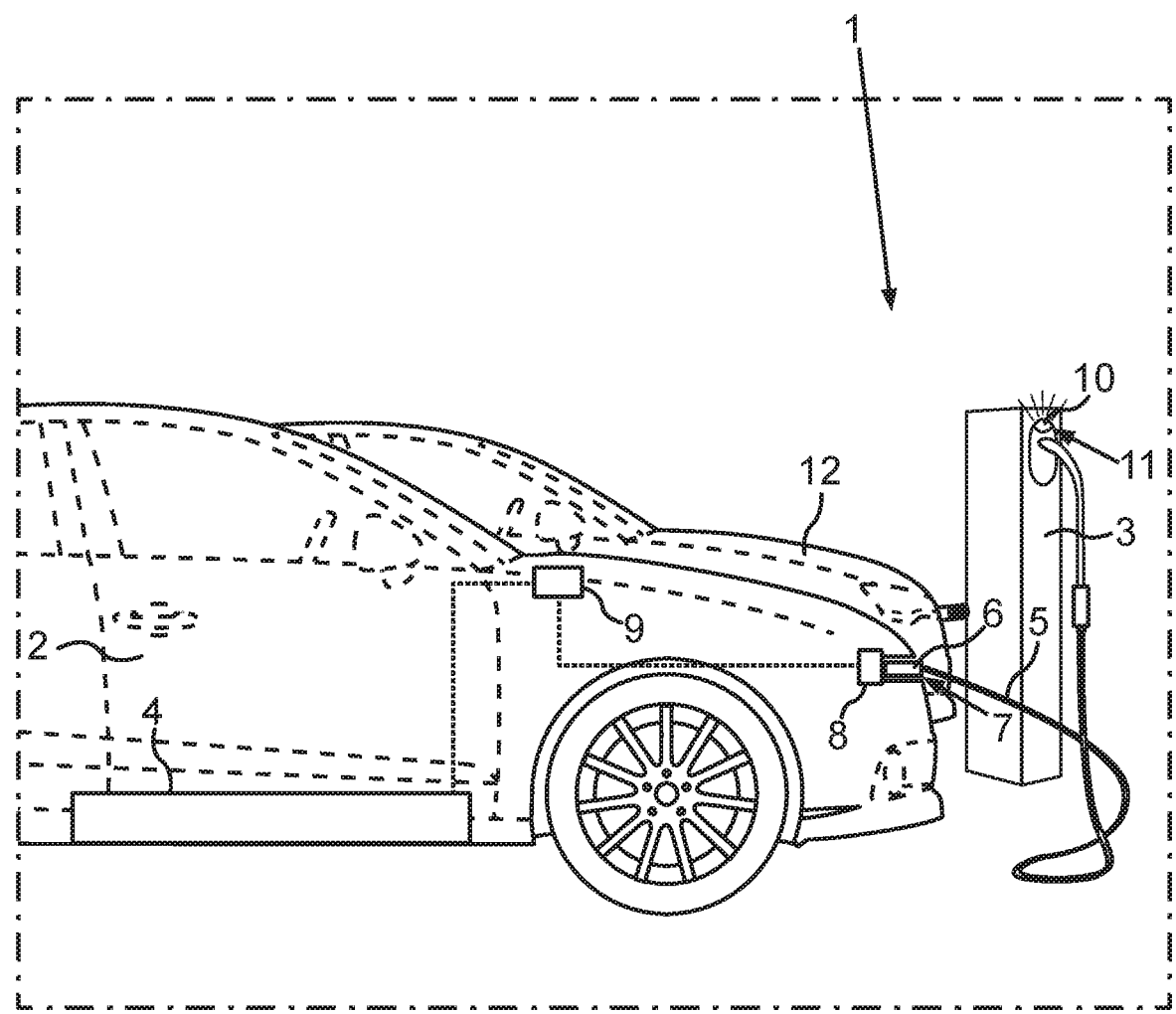

METHOD FOR AUTOMATIC UNLOCKING OF A CHARGING ARRANGEMENT AND MOTOR VEHICLE

FIELD

The invention relates to a method for the automatic unlocking of a charging arrangement and to a motor vehicle.

BACKGROUND

A method is already known from DE 10 2013 015 954 A1 for recharging an energy supply unit of an electric motor vehicle with electrical energy from an electric charging station. In this case, a charging cable of the charging station is locked to the electric motor vehicle prior to the start of a charging operation. After the electric motor vehicle has received a universal release signal, the locking of the charging cable is released if the charging operation is concluded at this point in time. The universal release signal is generally understood to mean any suitable signal whose validity is not limited to a single, individual electric motor vehicle. Said universal release signal is suitable for bringing about an unlocking of the charging cable for all electric motor vehicles that can be connected to the charging cable of the charging station. Consequently, it is possible not only for persons who are authorized to drive the electric motor vehicle connected to the charging cable, but also for third parties, to achieve an unlocking of the charging cable, because the release of the charging cable takes place as a function of receiving the universal release signal.

A method is further known from DE 10 2009 039 651 A1 for making available a power connection in a charging station having at least two power outlets for an electrically operable vehicle. After a charging operation of the electrically operable vehicle has concluded, a plug that is locked in the power outlet can be unlocked, as long as a release signal is received. The release signal can be generated automatically when a user returns to the vehicle, for example, when the user is identified automatically by means of an RFID tag. The user can also transmit the release signal together with a termination signal to the power outlet. Advantageously, through the unlocking of the plug after receipt of the release signal, it can be ensured that the charging cable is locked until the user returns to the charging station and the charging cable is thereby protected against theft. In this way, an unauthorized appropriation of the charging cable is prevented.

Furthermore, known from DE 10 2014 226 755 A1 is a device for the electrical connection of a charging station to a charging socket of a vehicle. In order to charge an energy storage unit of the vehicle, a contact head is inserted into a charging socket of the vehicle. In this way, an electrical connection is made between a voltage source and the vehicle. After the charging operation of the energy storage unit of the vehicle has concluded, a supply of voltage between the charging station and the vehicle is interrupted and the contact head is pulled back out of the charging socket. Accordingly, the vehicle is automatically disconnected from the charging station as soon as the charging operation is concluded.

SUMMARY

The object of the present invention is to create a method for automatic unlocking of a charging arrangement as well as a motor vehicle, so that a charging station can be utilized especially advantageously for charging a plurality of motor vehicles.

This object is achieved in accordance with the invention by a method for the automatic unlocking of a charging arrangement and by a motor vehicle having the features of the independent patent claims. Advantages embodiments with appropriate enhancements of the invention are presented in the respective dependent claims as well as in the following description.

A first aspect of the invention relates to a method for the automatic unlocking of a charging arrangement in which an electrically drivable motor vehicle is connected to a charging station. The electrically drivable motor vehicle, which, in particular, is a passenger automobile, comprises a battery that can be charged by means of electrical energy from the charging station. In order to prevent an interruption of a charging operation of the battery, the motor vehicle and the charging station are mechanically connected and locked during the charging. Once a predetermined state of charge has been reached for the battery of the motor vehicle, an automatic unlocking of the mechanical connection between the charging station and the motor vehicle occurs. In this case, the motor vehicle can detect a respective state of charge of the battery, and, when the predetermined state of charge has been reached, unlock the mechanical connection. In this way, it can be ensured that the mechanical connection between the motor vehicle and the charging station is severed only when the battery has reached the predetermined state of charge. Accordingly, the battery can be charged without any interruption, at least until the predetermined state of charge has been reached in the scope of the charging operation, because the mechanical connection is locked prior to attaining the predetermined state of charge. Once the mechanical connection has been unlocked, the motor vehicle generates an unlocking signal. Said unlocking signal characterizes the unlocking of the mechanical connection. The generated unlocking signal is subsequently transmitted from the motor vehicle to the charging station, which, in consequence thereof, signals that the charging station is free or available. This means that the charging station receives the unlocking signal provided by means of the motor vehicle and, in consequence thereof, signals the unlocking of the mechanical connection. In this way, it is possible especially advantageously for a third party to be informed that the charging station is available and the mechanical connection between the motor vehicle and the charging station is unlocked and accordingly can be disconnected. Accordingly, in the method, the mechanical connection is unlocked when the predetermined state of charge has been reached, with the charging station remaining mechanically connected to the motor vehicle until the mechanical connection between the charging station and the motor vehicle is explicitly disconnected. Accordingly, the motor vehicle can be disconnected from the charging station, as required, by the third party or the driver, for example. This makes it possible for a charging station to be utilized by a plurality of motor vehicles in that the charging station signals that a charging operation of a motor vehicle that is mechanically connected to the charging station is concluded and the mechanical connection is unlocked, so that the charging station can be connected to another vehicle that differs from this motor vehicle in order to charge the other vehicle. In this way, it can be prevented that the charging station remains locked with the motor vehicle, even though the battery has reached the predetermined state of charge and, accordingly, the motor vehicle unnecessarily occupies the charging station. The method makes possible an especially efficient utilization of the charging station for charging a plurality of motor vehicles or vehicles, in order to charge the batteries thereof to the predetermined state of charge thereof in each case.

In an advantageous enhancement of the method according to the invention, it is provided that, prior to attaining the predetermined state of charge, the mechanical connection between the charging station and the motor vehicle is automatically unlocked, as soon as a time interval of a valid reservation of another motor vehicle starts running. This means that the charging station is reserved by means of the other motor vehicle for the time interval and the mechanical connection is automatically unlocked as soon as the time interval starts running. The valid reservation characterizes the time interval in which the charging station is to be available for the other motor vehicle. Accordingly, for example, the mechanical connection is automatically unlocked once the time interval of the valid reservation starts. The other motor vehicle can identify itself to the charging station as the other motor vehicle having the valid reservation, in order to make possible a mechanical connection of the other motor vehicle to the charging station during the time interval of the valid reservation. For this purpose, the other motor vehicle can provide, for example, an identification number to the charging station, by means of which the other motor vehicle can be identified by the charging station. In the method, it is possible, for example, for a mechanical connection of the charging station to motor vehicles to be automatically unlocked, once the time interval of the valid reservation starts running, except for a mechanical connection between the other motor vehicle having a valid reservation for the time interval and the charging station. Accordingly, it can advantageously be achieved, for example, that, during the time interval, only the other motor vehicle having the valid reservation will be charged by means of the charging station.

In this connection, it has proven to be advantageous when the mechanical connection is automatically unlocked only when, in addition to the running time interval of the reservation, a charge readiness signal of the other motor vehicle is present, which characterizes a readiness of the other motor vehicle to receive electrical energy from the charging station. Accordingly, the mechanical connection is automatically unlocked once the time interval of the valid reservation of the other motor vehicle starts running and the other motor vehicle signals to the charging station by means of the charge readiness signal that it is ready to receive electrical energy from the charging station. Accordingly, the mechanical connection between the charging station and the motor vehicle is only or first automatically unlocked when the other motor vehicle that has the valid reservation for the time interval is actually ready to be charged. In this way, it can be prevented that the connection between the charging station and the motor vehicle is automatically unlocked even though, in spite of the time interval of the valid reservation that starts running, the other motor vehicle is not yet ready to be mechanically connected to the charging station and/or to receive electrical energy from the charging station. For example, the other motor vehicle that has the valid reservation is not ready to receive electrical energy from the charging station, if, in spite of the time interval that starts running, it is located outside a range for energy transfer relative to the charging station. If the mechanical connection between the motor vehicle and the charging station were nonetheless automatically unlocked, even though the other motor vehicle that has the valid reservation is not ready to be charged by means of the charging station, then, in the case of an automatic unlocking of the mechanical connection, the charging station would remain unused until the other motor vehicle is ready to be charged. Because the automatic unlocking of the mechanical connection between the charging station and the motor vehicle is produced only when both the charge readiness signal that characterizes the charge readiness of the other motor vehicle having the valid reservation is present and the time interval starts running, it is possible to utilize the charging station especially efficiently for charging both the motor vehicle and the other motor vehicle.

In another advantageous embodiment of the invention, it is provided that the time interval and/or the charge readiness signal is or are provided by the other motor vehicle by means of a chip card and/or by means of a mobile telephone and/or by means of Bluetooth and/or by means of transmitted GPS data. In other words, the time interval and/or the charge readiness signal is or are transmitted from the other motor vehicle to the charging station by means of the chip card, for example, via an RFID chip, and/or by means of the mobile telephone, which can be a smartphone, for example, and/or by means of Bluetooth, and/or by means of the transmitted GPS data, which, for example, can have a time stamp. In this way, an especially secure and simple transmission of the time interval and/or of the charge readiness signal from the other motor vehicle having the reservation to the charging station is made possible.

In another advantageous embodiment of the invention, for notifying the driver of the motor vehicle, it is provided that the charging station provides the motor vehicle with an unlocking signal characterizing the automatic unlocking. In other words, the charging station provides the unlocking signal for the motor vehicle, with the unlocking signal characterizing that the mechanical connection to the charging station has been automatically unlocked. This unlocking signal can be emitted via the motor vehicle to the driver of the motor vehicle. Alternatively or additionally, the unlocking signal can be transmitted from the motor vehicle to a smart device of the driver of the motor vehicle, for example, in order to inform the driver of the motor vehicle. In this way, the driver of the motor vehicle can be advantageously informed whether his motor vehicle is being charged by means of the charging station or whether the mechanical connection between his motor vehicle and the charging station has been automatically unlocked, and, accordingly, a charging of his motor vehicle has been interrupted.

In another embodiment of the invention, it has been found to be advantageous when the charging station provides the motor vehicle with an unlocking command that characterizes the unlocking, and the motor vehicle unlocks the mechanical connection once the motor vehicle receives the unlocking command. Accordingly, the charging station advantageously triggers the automatic unlocking of the mechanical connection between the charging station and the motor vehicle. Therefore, it can be specified by the charging station when and whether the mechanical connection is unlocked. An action of the motor vehicle or of the driver of the motor vehicle is consequently not necessary. Alternatively or additionally, for the automatic unlocking of the mechanical connection between the motor vehicle and the charging station, the charging station can automatically unlock the mechanical connection.

In another advantageous embodiment of the invention, it is provided that the charging station signals the time interval of the reservation. This means that the charging station displays the time interval for which the reservation already exists. For example, for this purpose, the charging station can have an output device, by means of which the time interval of the reservation can be output. For example, the time interval of the reservation can be output by means of a light signal, so that a driver who is approaching the charging station can determine whether a reservation of the charging station exists and for which time interval the reservation is present. On the basis of the time interval of the reservation displayed by means of the charging station, the driver can decide whether he wishes to connect his motor vehicle to the charging station or else instead wishes to connect his motor vehicle to another charging station. On the basis of the output time interval of the reservation, the driver can estimate especially advantageously how long his motor vehicle can presumably be charged by means of the charging station until a mechanical connection between the charging station and his motor vehicle would, if applicable, automatically be unlocked on account of the reservation. Accordingly, the driver can make an especially informed decision as to whether he wishes to connect his motor vehicle to the charging station.

In another advantageous embodiment of the invention, it is provided that a time interval and/or a starting time point of the reservation is or are determined by a navigation system of the other motor vehicle and the reservation is made by means of the navigation system. This means that the other motor vehicle has the navigation system, by means of which a travel route of the other motor vehicle from its current location to the charging station can be determined. Depending on the travel route that is to be traversed from the location of the other motor vehicle to the charging station, the navigation system can determine the point in time at which the other motor vehicle presumably will arrive at the charging station. This point in time is an expected time point of arrival. Depending on the expected time point of arrival, the navigation system can determine the starting time point of the reservation and reserve the charging station for the expected time point of arrival as the starting time point, for example. The navigation system can thereby suggest to the driver of the other motor vehicle a selection of at least two different starting time points of the reservation, with the navigation system making a reservation of the charging station as a function of the starting point time selected by the driver. Furthermore, the navigation system can determine an amount of electrical energy that is present in the other vehicle for driving the other motor vehicle and, depending on the determined amount of electrical energy that is present for driving the other motor vehicle, determine the time interval of the reservation. Alternatively or additionally, the navigation system can calculate a travel route of the motor vehicle from the charging station to a destination specified by the driver of the other motor vehicle and, depending on the travel route between the charging station and the destination specified by the driver, calculate an expected amount of electrical energy that is required for driving the other motor vehicle in order to traverse the travel route. Depending on the expected required amount of electrical energy for driving the other motor vehicle over the distance from the charging station to the destination, the navigation system can determine the time interval for the reservation. Alternatively or additionally, the navigation system can specify to the driver of the other motor vehicle a selection of at least two time intervals for the reservation and set the time interval for the reservation depending on the selection by the driver. By means of the navigation system and/or by means of a smart device of the driver of the other motor vehicle, the reservation can be activated for the time interval and at the starting time point. For example, the reservation is provided thereby for the charging station by the navigation system and/or by the smart device of the driver of the other motor vehicle. The described advantageous enhancement of the method makes possible, by means of the navigation system, an especially charge-efficient travel route as well as an especially time-efficient charging of the other motor vehicle, because the navigation system determines recharging breaks for the other motor vehicle for traversing the travel route and activates the reservation in accordance with the recharging breaks. In this way, it can be ensured that the motor vehicle can traverse the travel route especially rapidly, because, in particular, on account of the reservation, the motor vehicle can then be charged as soon as it has arrived at the charging station, provided that the navigation system determines and activates the time interval and/or the starting time point of the reservation as a function of the travel route and/or the location of the motor vehicle.

In another advantageous embodiment of the invention, it is provided that, by means of the charging station, the motor vehicle and at least one other motor vehicle are recharged via respective charging connectors of the charging station up to a respective predetermined state of charge, with a charging power of the at least one charging connector connected to the other vehicle being changed by means of the charging station as soon the motor vehicle has the predetermined state of charge. This means that the charging station is connected via the charging connectors thereof to at least two motor vehicles, with a respective discharging power of the charging station being adjusted depending on a state of charge of the motor vehicle that is connected to the charging station. In this case, it is possible to supply the motor vehicles that are connected to the charging station with electrical energy via different charging connectors of the charging station with different discharging powers. A first discharging power of the charging station for the motor vehicle can be greater than or less than a second discharging power of the charging station for the other motor vehicle. The discharging power by means of which the respective motor vehicles that are connected to the charging station are supplied with electrical energy is dependent on a maximum recharging power of the respective motor vehicles that are connected to the charging station and/or is dependent on the order in which the mechanical connections are made between the respective motor vehicles and the charging station and/or is dependent on a price for the electrical energy provided by the charging station. Accordingly, the discharging power of the charging station can be adjusted especially advantageously to at least one of these factors.

In this context, it has been found to be advantageous when the charging power of the at least one charging connector that is connected to the other motor vehicle is zero as long as a state of charge of the motor vehicle lies below the predetermined state of charge. This means that, once the state of charge of the motor vehicle has reached the predetermined state of charge, the discharging power of the other motor vehicle connected to the charging station is raised from zero to a discharging power value of greater than zero. Consequently, the motor vehicle is first charged to the predetermined state of charge and the other motor vehicle is not supplied with electrical energy from the charging station as long as the state of charge of the motor vehicle lies below the predetermined state of charge. As soon as the state of charge of the motor vehicle has reached the predetermined state of charge, the charging station makes available its discharging power to the at least one other motor vehicle connected to the charging station. Accordingly, it is possible to charge a plurality of motor vehicles that can be supplied with electrical energy by means of the charging station, each in succession, up to the predetermined states of charge thereof. Accordingly, it can be ensured that the motor vehicles are charged, in accordance with the order in which they are connected to the charging station, in succession, to the respectively predetermined state of charge. Consequently, a respective charging time period for each of the motor vehicles can be kept especially short for charging to the predetermined state of charge from the start of the charging operation.

In an advantageous embodiment of the invention that is an alternative to this, it is provided that a maximum discharging power of the charging station is determined and, depending on how much of the discharging power the motor vehicle and the at least one other motor vehicle is ready to receive, the discharging power is distributed over the charging connectors of the charging station. This means that a respective maximum recharging power of the motor vehicles connected to the charging station via the charging connectors is determined and the discharging power of the charging station is distributed, depending on the maximum recharging powers of the respective motor vehicles connected to the charging station via the charging connectors, over the charging connectors of the charging station. This makes it possible to supply electrical energy to the motor vehicles that are simultaneously connected to the charging station, with a respective discharging power of the charging station assigned to the respective motor vehicles being adjusted depending on a maximum charging power of the respective motor vehicle. In this case, it is possible, for example, to prioritize the motor vehicles connected to the charging station as a function of the order of connection of the particular motor vehicle to the charging station. This means that, in accordance with its maximum recharging power, a first motor vehicle, in particular the motor vehicle that is connected to the charging station, is supplied with electrical energy by the charging station with a discharging power corresponding to the maximum recharging power. Any still available residual discharging power of the charging station can be distributed over other motor vehicles that have been connected to the charging station later in time than the motor vehicle. In this way, it is achieved that the motor vehicles connected to the charging station are supplied with the discharging power in a prioritized fashion in accordance with their order of connection to the charging station, with it being possible to ensure that the maximum discharging power made available by the charging station is utilized especially advantageously, because discharging power that is not needed by the motor vehicle due to the maximum recharging power thereof can be made available to the at least one other motor vehicle. In this way, it is possible for an especially efficient charging of a plurality of motor vehicles to be produced by means of the charging station.

In another advantageous embodiment of the invention, it is provided that, during automatic unlocking, either a charging plug on the vehicle side, which is inserted into a charging socket of the charging station and locked in place with it, is unlocked, or else a plug on the charging station side, which is inserted into a charging socket on the vehicle side and locked in place with it, is unlocked. In other words, the motor vehicle has the charging plug on the vehicle side and the charging station has the charging socket on the charging station side, or the motor vehicle has the charging socket on the vehicle side and the charging station has the charging plug on the charging station side. In both cases, the charging plug is connected to the charging socket by inserting the respective charging plug into the charging socket. In this case, the charging plug and/or the charging socket can have a locking device, by means of which the mechanical connection between the charging plug and the charging socket can be locked and released. During automatic unlocking, the mechanical connection between the charging socket and the charging plug is unlocked or released and the unlocking signal characterizing the release is provided for the charging station by the motor vehicle. The mechanical connection of the motor vehicle to the charging station, comprising the charging plug and the charging socket, has the advantage that the motor vehicle can be connected especially securely to the charging station and the mechanical connection can be especially simply locked and released by means of the locking device.

In an advantageous enhancement of the invention, it is provided that the predetermined state of charge is specified as a function of a user default. This means that the motor vehicle receives the user default that characterizes the predetermined state of charge. After the predetermined state of charge has been received, the motor vehicle can compare the respective state of charge of the battery with the predetermined state of charge and, depending on the comparison, unlock the mechanical connection automatically. In this case, the user default can characterize, for example, that a user activating the user default wishes a charging of the battery up to a state of charge of 75 percent, for example, so that the state of charge of the battery can very rapidly reach the predetermined state of charge in the scope of the charging operation and the user can utilize the motor vehicle especially rapidly.

In an alternative advantageous embodiment of the invention, it is provided that the predetermined state of charge is a fully charged state of the battery. The fully charged state of the battery is understood to mean that the predetermined state of charge of the battery corresponds to at least 90 percent, in particular at least 95 percent, in particular at least 99 percent, in particular 100 percent, of a charging capacity of the battery. This makes it possible to ensure that the mechanical connection between the motor vehicle and the charging station is only unlocked when the battery of the motor vehicle is fully charged. In this way, the third party is enabled to undo the mechanical connection between the motor vehicle and the charging station only when the battery of the motor vehicle is fully charged.

In another advantageous embodiment of the invention, it is provided that the charging station signals by means of an output device that the charging station is available. This means that, by means of the output device, the charging station provides a release notification, which characterizes that the charging station is available. In this case, the output device can be a part of the charging station or else be distanced from the charging station and external to the charging station. For example, the output device comprises a display screen device and/or a light element and/or a speaker device and/or another device, by means of which a haptic and/or acoustic and/or optical release signal can be output. This makes possible an especially extensive notification of the third party and/or of the driver of the motor vehicle as to whether the charging station is available and, accordingly, as to whether the mechanical connection between the charging station and the motor vehicle is unlocked.

In another advantageous embodiment of the invention, it is provided that the charging station transmits the unlocking signal to a server device, which transmits the unlocking signal to an app, with the app, in consequence thereof, signaling that the charging station is available. The app can be a software application of a smart device, such as, for example, a smartphone, or else of a computing device of the motor vehicle or a computing device of the other vehicle. The unlocking signal for the server device is provided by means of the charging station. After the unlocking signal has been received by the server device, the server device provides the unlocking signal for the app. After the unlocking signal has been received, the app signals by means of, for example, a haptic and/or optical and/or acoustic signal that the charging station is available. The app can signal to the driver of the motor vehicle and/or to the third party that the mechanical connection between the motor vehicle and the charging station is unlocked. In this case, the app can be installed on the smart device and/or in the computing device of the motor vehicle and/or in the computing device of the other vehicle, so that, by means of the smart device and/or by means of the computing device of the motor vehicle and/or by means of the computing device of the other vehicle, it can be signaled to the driver and/or to a third party that the charging station has been released from the motor vehicle. In this way, the driver and/or the third party can be informed about the available charging station, even when they are distanced from the charging station and/or distanced from the output device.

In another embodiment of the invention, it has been shown to be advantageous when the motor vehicle transmits a state of charge signal, which characterizes a state of charge of the battery, to the charging station, with the charging station determining, depending on the state of charge signal, a remaining charging time of the battery required to reach the predetermined state of charge. In other words, the motor vehicle can determine a difference between a respective state of charge of the battery and the predetermined state of charge, and, from this difference, determine the remaining charging time of the battery. Subsequently, the motor vehicle generates the state of charge signal characterizing the remaining charging time of the battery and provides said state of charge signal for the charging station. In an alternative embodiment, the motor vehicle provides the charge signal characterizing the respective state of charge of the battery for the charging station, with the charging station determining the remaining charging time of the battery from the difference between the respective state of charge of the battery and the predetermined state of charge of the battery. In this way, it can be especially advantageously determined how long the charging operation of the battery will presumably still last and at which point in time the mechanical connection will presumably be unlocked.

In this case, it has been demonstrated to be advantageous when, by means of an output device, the charging station displays the remaining charging time of the battery. The charging station can thereby signal the remaining charging time by means of the same output device by means of which the charging station signals that the charging station is available. Alternatively, the charging station can signal the remaining charging time of the battery by means of another output device. The other output device can be arranged at the charging station or can be remote from the charging station and accordingly arranged externally. Furthermore, the output device can have a display screen device and/or a light element and/or a speaker device and/or a means for the generation of an acoustic and/or optical and/or haptic signal. This makes it possible for the driver of the motor vehicle and/or the third party to be informed very comprehensively as to the remaining charging time of the battery.

In another advantageous embodiment of the invention, it is alternatively or additionally provided that the charging station transmits the remaining charging time of the battery to a server device, which transmits the remaining charging time of the battery to an app, with the app, in consequence thereof, outputting the remaining charging time of the battery. In this case, the server device and the app can be the server device and the app to which the charging station transmits the unlocking signal. The server device is a master server device, which is arranged externally to the motor vehicle and externally to the other vehicle and externally to the charging station and which serves as a mediator for transmission of the remaining charging time from the charging station to the app. Accordingly, via the app, the remaining charging time of the battery can be output to the driver and/or the third party, regardless of the distance of the driver and/or the third party from the charging station and/or from the motor vehicle and/or from the other vehicle.

Another aspect of the invention relates to a motor vehicle that can be electrically driven and that is equipped for connection to a charging station in order to charge a battery of the electrically operable motor vehicle in the scope of a charging operation. The motor vehicle is further equipped to automatically unlock a mechanical connection between the charging station and the motor vehicle as soon as a predetermined state of charge for the battery of the motor vehicle has been reached. In this case, the motor vehicle can carry out a comparison between a current state of charge of the battery and the predetermined state of charge of the battery, and, depending on the comparison, release the mechanical connection. The motor vehicle is further equipped for generating an unlocking signal once the mechanical connection has been unlocked. In addition, the motor vehicle is equipped for transmitting the generated unlocking signal to the charging station, which, in consequence thereof, signals that the charging station is available. In particular, the motor vehicle is equipped for carrying out the above-discussed method according to the invention. Advantageously, the motor vehicle can release the mechanical connection between the motor vehicle and the charging station as soon as the battery has reached the predetermined state of charge, so that the charging station can be utilized for charging another vehicle. In this way, an especially efficient utilization of the charging station for charging a plurality of batteries of different vehicles or motor vehicles is possible.

The invention also includes a control unit for the motor vehicle. The control unit has a processor device, which is equipped for carrying out an embodiment of the method according to the invention. For this purpose, the processor device can have at least one microprocessor and/or at least one microcontroller. Furthermore, the processor device can have programming code, which, when it is run by the processor device, is written to carry out the embodiment of the method according to the invention. The programming code can be stored in a data memory of the processor device.

Advantages and advantageous embodiments of the method according to the invention are to be regarded as advantages and advantageous embodiments of the motor vehicle according to the invention, and vice versa. For this reason, the advantages and advantageous embodiments of the motor vehicle according to the invention are not described here once again.

The invention also comprises combinations of the embodiments described.

BRIEF DESCRIPTION OF THE DRAWING

Exemplary embodiments of the invention are described below. For this purpose, FIG. 1 shows a diagram of the method for the automatic unlocking of a charging arrangement, wherein an electrically drivable motor vehicle is connected to a charging station, with the motor vehicle automatically unlocking a mechanical connection between the motor vehicle and the charging station as soon as a state of charge of a battery of the motor vehicle corresponds to a predetermined state of charge for the battery and the motor vehicle provides the charging station with a signal characterizing the automatic unlocking.

The exemplary embodiments explained below are preferred embodiments of the invention. In the exemplary embodiments, the described components of the embodiments each represent individual features of the invention, which are independent of one another and each of which the invention further develops also independently of one another, and hence are to be regarded, taken individually or in a combination differing from the combination shown, as belonging to the invention. Furthermore, the described embodiments can also be supplemented by features that are additional to those of the invention already described.

DETAILED DESCRIPTION

Illustrated in FIG. 1 is a schematic side view of a charging arrangement 1, in which an electrically drivable motor vehicle 2 is connected to a charging station 3. The electrically drivable motor vehicle 2 has a battery 4, which can be charged by means of electrical energy from the charging station 3. During a charging operation of the battery 4, the charging station 3 is connected to the motor vehicle 2 via a charging cable 5. In this case, a charging plug 6 on the charging station side is inserted into a charging socket 7 of the motor vehicle 2 on the vehicle side and locked in place with it during a charging operation of the battery 4. For this purpose, the motor vehicle 2 can have a locking device 8, by means of which a mechanical connection between the charging plug 6 on the charging station side and the charging socket 7 on the vehicle side can be locked during the charging operation of the battery 4.

Furthermore, the motor vehicle 2 can have a computing device 9, by means of which a state of charge of the battery 4 can be determined and can be compared with a predetermined state of charge. This predetermined state of charge of the battery 4 can be specified depending on a user default received by means of the computing device 9 or can characterize a fully charged state of the battery 4. If the computing device 9 determines that the predetermined state of charge for the battery 4 of the motor vehicle 2 has been reached and, accordingly, the state of charge corresponds to the predetermined state of charge, then the computing device 9 triggers an automatic unlocking of the mechanical connection between the charging plug 6 on the charging station side and the charging socket 7 on the vehicle side by means of the locking device 8. Subsequently, the computing device 9 generates an unlocking signal, which characterizes the unlocking of the mechanical connection as soon as the mechanical connection has been unlocked. Subsequent to this, the computing device 9 provides the unlocking signal generated for the charging station 3.

The charging station 3 signals that the charging station 3 is available as soon as the charging station 3 has received the generated unlocking signal. In the present case, the charging station 3 signals by means of an output device 11 comprising at least one light element 10 that the charging station 3 is available and that the mechanical connection between the charging station 3 and the motor vehicle 2 is unlocked. Alternatively or additionally, the charging station 3 can transmit the unlocking signal received from the motor vehicle 2 to an external master server device of the charging arrangement 1 and said master server device can, in turn, transmit the unlocking signal to an app. This app can be installed on a smart device, such as a smartphone or a smartwatch or a tablet computer, or in the computing device 9 of the motor vehicle 2. This app signals, as a consequence of receiving the unlocking signal, that the charging station 3 is available.

If a third party sees, on the output device 11 of the charging station 3 and/or on the app, that the mechanical connection between the motor vehicle 2 and the charging station 3 is unlocked, then the third party can sever the mechanical connection between the motor vehicle 2 and the charging station 3. Subsequently, the third party can connect the charging station 3 to another motor vehicle 12 in order to charge the battery of the other motor vehicle 12. This makes it possible for the other motor vehicle 12 to be charged by means of the charging station 3 as soon as the predetermined state of charge for the battery 4 of the motor vehicle 2 has been reached, and, in consequence thereof, the mechanical connection between the motor vehicle 2 and the charging station 3 has been automatically unlocked. Accordingly, the mechanical connection is unlocked not just by an action of the driver of the motor vehicle 2. The automatic unlocking of the charging arrangement 1 makes possible an especially efficient utilization of the charging station 3 for charging a plurality of batteries of different motor vehicles to the predetermined state of charge in each case.

The motor vehicle 2 can transmit a state of charge signal, which characterizes a state of charge of the battery 4, to the charging station 3, wherein the charging station 3 determines, depending on the state of charge signal, a remaining charging time of the battery 4 to reach the predetermined state of charge. Alternatively, on the basis of the state of charge of the battery 4 and the predetermined state of charge for the battery 4, the motor vehicle 2 can determine the remaining charging time of the battery 4 and transmit this information as the state of charge signal to the charging station 3. As a consequence of receiving the state of charge signal, the charging station 3 can display or output the remaining charging time by means of the output device 11 via at least one light element 10 and/or by means of a display screen device, which is not shown. Alternatively or additionally, the charging station 3 can transmit the remaining charging time of the battery 4 to the server device, which transmits the remaining charging time of the battery 4 to the app. As a consequence of receiving the remaining charging time of the battery 4, the app outputs this information to the driver of the motor vehicle 2 and/or to the third party. On the basis of the remaining charging time, the third party can advantageously determine how long the mechanical connection between the motor vehicle 2 and the charging station 3 is expected to be locked or at which point in time the automatic unlocking of the mechanical connection is expected to take place. In an applied case, a driver of the other motor vehicle 12, which may involve the third party, can select, from a plurality of different charging stations 3 displaying remaining charging times, a charging station 3 with an especially short remaining charging time in comparison to the other respective charging stations 3, in order to charge the motor vehicle 12 after a short time by means of the selected charging station 3. Alternatively or additionally, the driver of the other motor vehicle 12 can select from the plurality of charging stations 3 the charging station 3 that signals that the charging station 3 in question is available.

As can be seen in FIG. 1, the motor vehicle 2 is supplied with electrical energy by means of the charging station 3. In this case, the mechanical connection between the charging station 3 and the motor vehicle 2 can be automatically unlocked prior to attaining the predetermined state of charge, provided that a valid reservation of the other motor vehicle 12 for the charging station 3 is present, and the time interval of the valid reservation starts running. This means that the mechanical connection between the charging station 3 and the motor vehicle 2 is unlocked as soon as the time interval in which the charging station 3 is reserved for the other motor vehicle 12 starts running. In order to prevent the unlocking of the mechanical connection between the motor vehicle 2 and the charging station 3 during the running time interval of the reservation, even though the other motor vehicle 12 is not yet ready to be connected to the charging station 3, the mechanical connection can, in particular, be automatically unlocked only when, in addition to the running time interval of the reservation, a charge readiness signal of the other motor vehicle 12 is present. This charge readiness signal of the other motor vehicle 12 characterizes that the other motor vehicle 12 is ready to be connected to the charging station 3 in order to supply it with electrical energy from the charging station 3. Accordingly, the mechanical connection between the motor vehicle 2 and the charging station 3 is mechanically unlocked only when both the time interval of the reservation starts running and the other motor vehicle 12 is ready to receive electrical energy from the charging station 3. In this case, the other motor vehicle 12 can be ready to be supplied with electrical energy from the charging station 3 when, in particular, the motor vehicle 12 is arranged within a defined maximum distance from the charging station 3. The defined maximum distance from the charging station 3 can thereby depend on a length of the charging cable 5 of the charging station 3. Accordingly, the charging cable 5 can characterize the defined maximum distance that the other motor vehicle 12 may have from the charging station 3 for it to be ready to be charged.

In this case, the time interval and/or the charge readiness signal can be provided by means of a chip card, provided that the other motor vehicle 12 is situated within a radiofrequency radius of the chip card from the charging station 3, and/or is or are provided for the charging station 3 by means of a mobile telephone and/or by means of Bluetooth and/or by means of transmitted GPS data from the other motor vehicle 12. The chip card is equipped for providing this charge readiness signal for the charging station 3 as soon as the motor vehicle 12 is arranged within the predetermined maximum distance from the charging station 3.

By means of the output device 11, it is possible, via the at least one light element 10 and/or by means of a device screen, which is not illustrated, to output the time interval of the reservation by means of the charging station 3. In this way, persons who are located in the vicinity of the charging station 3 can be informed about the time interval of the reservation. Alternatively or additionally, it is possible by means of the charging station 3 to provide the time interval of the reservation for at least one motor vehicle in order to inform the motor vehicle about the time interval of the reservation. Depending on the output time interval of the reservation, it is thus possible, as a consequence of informing the person and/or the motor vehicle, to select the charging station 3 depending on the time interval of the reservation.

In the present case, the reservation is activated by means of a navigation system of the other motor vehicle 12, with the navigation system determining both a starting time point of the reservation and a time interval of the reservation and providing them for the charging station 3. In this case, the navigation system can determine both the starting time point of the reservation and the time interval of the reservation as a function of a location of the other motor vehicle 12, and/or depending on a planned travel route of the other motor vehicle 12. Alternatively or additionally, the navigation system can determine the starting time point of the reservation and/or the time interval of the reservation depending on a user input of a vehicle occupant of the other motor vehicle 12.

For carrying out the unlocking, the charging station 3 can provide an unlocking command characterizing the unlocking for the motor vehicle 2. The motor vehicle 2 unlocks the mechanical connection as soon as the motor vehicle 2 receives the unlocking command from the charging station. Accordingly, the motor vehicle 2 can both lock the mechanical connection and unlock the mechanical connection, with it being possible to control the locking or the unlocking by means of the charging station 3. An unlocking signal characterizing the unlocking can be provided from the charging station 3 for the motor vehicle 2, so that, by means of the motor vehicle 2, the driver of the motor vehicle 2 can be informed of the unlocking of the mechanical connection. In this way, it is possible for the driver of the motor vehicle 2 to know at any time whether the motor vehicle 2 is locked to the charging station 3 or whether the motor vehicle 2 is unlocked from the charging station 3.

If both the motor vehicle 2 and the other motor vehicle 12 are connected to the charging station 3 via respective charging connectors of the charging station 3, so that both the motor vehicle 2 and the other motor vehicle 12 can be charged by means of the charging station 3 up to a respective predetermined state of charge, then it is possible by means of the charging station 3 to adjust a discharging power of the respective charging connectors of the charging station 3 connected to the motor vehicles 2, 12 depending on a respective state of charge of the motor vehicles 2, 12. This means that a recharging power of the other motor vehicle 12, with which the other motor vehicle 12 is supplied with electrical energy from the charging station 3, can be adjusted depending on a state of charge of the motor vehicle 2. If the state of charge of the motor vehicle 2 lies below a predetermined state of charge for the motor vehicle 2, then the other motor vehicle 12 is supplied with electrical energy with a first recharging power from the charging station 3. If a state of charge of the motor vehicle 2 corresponds to the predetermined state of charge or if the state of charge of the motor vehicle 2 lies above the predetermined state of charge, then the other motor vehicle 12 is supplied with electrical energy with a second recharging power from the charging station 3. In this case, the second recharging power can be greater than the first recharging power. In particular, a maximum discharging power of the charging station 3 can be determined and, depending on a respective maximum recharging power of the motor vehicle 2 and of the other motor vehicle 12, the discharging power of the charging station 3 can be distributed over the motor vehicles 2, 12. The recharging power of the motor vehicle 2 can be lowered to zero when the predetermined state of charge of the motor vehicle 2 is reached. Furthermore, when the predetermined state of charge of the motor vehicle 2 is reached, the discharging power provided beforehand to the motor vehicle 2 for reaching the predetermined state of charge can be made available to the other motor vehicle 12. Accordingly, the motor vehicles 2, 12 can be charged, in particular depending on the order of connection of the respective motor vehicles 2, 12 to the charging station 3, in succession, up to their respective predetermined state of charge.

The described method is based on the realization that, when a charging station is utilized for an electric automobile, conventionally a plug of a charging cable, which is inserted into the electric automobile, is unlocked only when an owner of the electric automobile unlocks the electric automobile. As a hospitality function, at that time, the owner of the electric automobile can retrieve via an app on his smartphone a current state of charge of his electric automobile and actively unlock the plug of the charging cable and accordingly release it for other users.

For the method described in connection with FIG. 1, an automatic unlocking is employed, which unlocks the charging cable 5 or the mechanical connection between the motor vehicle 2 and the charging station 3 as soon as the motor vehicle 2 is completely charged. When this unlocking has occurred, the charging station 3 receives a signal, which, in the present case, is the unlocking signal that characterizes that the motor vehicle 2 has unlocked the mechanical connection. On one end, the charging cable 5 can comprise the charging plug 6 on the charging station side, which is inserted into the charging socket 7 on the vehicle side, and, on the other end, can comprise a charging station plug, which is inserted into a charging station socket of the charging station 3 for connection to the charging station 3. After the mechanical connection has been unlocked, the charging plug 6 on the charging station side remains inserted unlocked in the charging socket 7 on the vehicle side and the charging station plug remains inserted unlocked in the charging station socket. For the mechanical connection between the motor vehicle 2 and the charging station 3, both the connection between the charging plug 6 on the charging station side and the charging socket 7 on the vehicle side and the connection between the charging station plug and the charging station socket can be locked and, in the process of the automatic unlocking, both connections or only one of the lockings can be unlocked. After the unlocking signal has been received, the charging station 3 signals to the other electric automobile drivers that the charging station 3 is available and the charging plug 6 on the charging station side can be removed from the parked or plugged-in motor vehicle 2. Accordingly, the charging station 3 can be utilized by a plurality of electric automobiles, provided that sufficient parking spots are available in a connection region around the charging station 3. Beoynd this, in this way, the charging station 3 cannot be blocked by an electric automobile.

The electric automobile or the motor vehicle 2 could transmit the time that it still needs for full charging of the battery 4 to the charging station 3. With this information characterizing the time, other electric automobile drivers could check when the charging station 3 will become available.

The motor vehicle 2 decides, on the basis of the state of charge of the battery 4, when the automatic unlocking will occur. Accordingly, the motor vehicle 2 does not need to rely on a signal from the third party or from the driver of the motor vehicle 2. Presumably no new hardware is thereby needed in the motor vehicle 2 or at the charging station 3, which, in the present case, is designed as a charging pole. Furthermore, the motor vehicle 2 forwards the unlocking signal to the charging station 3 when the automatic unlocking has occurred. When the automatic unlocking has not yet occurred, the motor vehicle 2 can characterize the information specifying how long the motor vehicle 2 still needs until it has reached the predetermined or desired state of charge and accordingly can be unlocked. Other electric automobile drivers can see by way of a signal at the charging station 3 or on the app that the motor vehicle 2 is just then connected to the charging station 3 and whether or when the charging plug 6 on the charging station side will be removed from the parked motor vehicle 2 and can be inserted for the other motor vehicle 12. This presumes correspondingly a number of parking spots next to the charging station 3.

A special application situation will be explained below: Arranged at the charging station 3, which, in the present case, is designed as a fast-charging station with charging cable 5, are two parking spots. The motor vehicle 2 is to be recharged with electrical energy at this fast-charging station. The driver of the motor vehicle 2 inserts the charging plug 6 on the charging station side, which is connected via the charging cable 5 to the charging station 3, into the charging socket 7 of the motor vehicle 2 on the vehicle side, and goes into a shopping center to shop or into a highway service area to eat, or into a supermarket to make purchases, et cetera. The charging operation of the battery 4 to the predetermined state of charge is concluded after 20 minutes. However, the driver needs 30 minutes or longer to shop or to eat or to make purchases. After the charging operation has concluded, the motor vehicle 2 would occupy the charging station 3 according to the current state of the art, even though it is no longer being charged. In the method for automatic unlocking of the charging arrangement 1, it is possible during the charging operation for other electric automobile drivers, in particular via the app, to check how long the motor vehicle 2 connected to the charging station 3 still needs until the battery 4 thereof has reached the predetermined state of charge and the motor vehicle 2 will release the charging station 3 for the next electric automobile or the other motor vehicle 12. After the charging plug 6 on the charging station side has been released by means of the motor vehicle 2, the other motor vehicle 12 parked at one of the parking spots assigned to the charging station 3 can be charged by means of the charging station 3 by removing the charging plug 6 on the charging station side from the charging socket 7 of the motor vehicle 2 on the vehicle side and by connecting it to the other motor vehicle 12.

In order to ensure that the charging station 3 is available in the reserved time interval for the other vehicle 12 having the reservation and is not blocked by the motor vehicle 2, the charging station 3 can be disabled relative to the motor vehicle 2 for the time interval of the reservation. In particular, when the other motor vehicle 12 that has the valid reservation arrives at the charging station 3, the motor vehicle 2 that occupies the charging station 3 without a reservation receives the unlocking command from the charging station 3, with the unlocking command characterizing that the mechanical connection needs to be unlocked. When the unlocking has occurred, the charging station 3 can display that the mechanical connection has been unlocked and the charging cable 5 has been removed from the motor vehicle 2 and can be connected to the other motor vehicle 12 that has the valid reservation. In this case, it is advantageous when an available parking spot is available for the other motor vehicle 12 within cable range and accordingly within the predetermined maximum distance from the charging station 3 defined by the charging cable 5. This method enables an especially full utilization of the charging station to be achieved and keeps especially small any risk that the motor vehicle 2 will occupy the charging station 3. A possible scenario could, in particular, proceed in such a way that, in holiday traffic, the driver of the other motor vehicle 12 reserves the charging station 3, which, in particular, is a fast-charging station assigned to a highway, at 2 p.m. for a period from 4 p.m. to 4:30 p.m. The possibility for reservation could, in particular, be incorporated in the navigation system. In the present case, the reserved charging station 3 is equipped with two charging cables 5 and two parking spots. A maximum parking time at the charging station 3 could be 45 minutes. At a parking spot of the charging station 3, it is possible, in particular, one hour prior to the time interval of the reservation, to signal on a display of the charging station 3 that this parking spot is to be utilized solely by the other motor vehicle 12 having the valid reservation. At 3:45 p.m., the motor vehicle 2 that does not have the valid reservation drives onto the unreserved parking spot at the charging station 3, which signals when it is reserved. The driver of the motor vehicle 2 can hereby obtain the information that the charging of the motor vehicle 2 will be interrupted at 4:00 p.m. or when the motor vehicle 12 having the reservation arrives. The driver of the motor vehicle 2 can go to eat in a highway restaurant and return to the motor vehicle 2 only at 4:30 p.m. At 4:10 pm., the other motor vehicle 12 having the valid reservation 12 arrives at the charging station 3 and drives onto the parking spot reserved for it. The other motor vehicle 12 or the driver of the other motor vehicle 12 can identify itself to the charging station 3 by means of a charging chip card or by means of GPS and/or Bluetooth data of the other motor vehicle 12 and/or by means of the mobile telephone. The charging station 3 detects that the other motor vehicle 12 having the valid reservation has arrived within the defined maximum distance and provides to the motor vehicle 2 the unlocking signal, which characterizes that the charging cable 5 is to be unlocked. The motor vehicle 2 can unlock the charging cable 5 and, via a signal, inform the charging station 3 of the unlocking. The charging station 3 can signal to the driver of the other motor vehicle 12 that the charging cable 5 can be removed from the motor vehicle 2 and inserted into the other motor vehicle 12. This method makes it possible for capacities of the charging station 3 to be optimally utilized and, accordingly, the charging station 3 is especially profitable for the operator. Beyond this, drivers of motor vehicles can plan a respective recharging of the motor vehicles 2, 12 in due course and, in particular, can avoid long waiting times at the charging station 3 during rush hours and/or holiday periods.

In order to prevent the other motor vehicle 12 from being able to be charged only when the charging cable 5 at the motor vehicle 2 and/or at the charging station 3 has been unlocked, a switching device, which is not illustrated in FIG. 1, can be arranged at the charging station 3 as well as at least one additional charging cable 5 with charging plugs 6. After or during the one charging operation of the motor vehicle 2, the other motor vehicle 12 can be connected by means of the at least one additional charging cable 5 or charging plug 6 to the charging station 3. A redirection of charging energy to the second charging cable 5 or to the second charging plug 6 could occur after charging of the motor vehicle 2 has concluded. In this way, a capacity of the charging station 3 can be optimally utilized. A specific exemplary application of the method will be discussed below. At the inner-city charging station 3, there can be four parking spots, which are arranged around the charging station 3. The charging station 3 can be equipped with four type 2 power outlets or with a charging cable 5 having respective charging plugs 6. At 6:00 p.m., a first motor vehicle can arrive at the charging station 3 and be connected mechanically to the charging station 3. This first motor vehicle can send a signal to the charging station 3, said signal characterizing how long a charging operation of the first motor vehicle requires until a desired state of charge is reached. The charging station 3 can output the time that the plugged-in first motor vehicle needs until the desired state of charge is reached via a display and/or via an app. At 6:15 p.m., a second motor vehicle arrives at the charging station 3 and is mechanically locked to the charging station 3. The charging station 3 can signal to the driver of the second motor vehicle that the charging station 3 will be switched only at 8 p.m. to the mechanical connection to the second motor vehicle and, accordingly, the second motor vehicle will be charged only starting at 8:00 p.m. The charging station 3 can output the time that the plugged-in second motor vehicle needs until its desired state of charge is reached via the display and/or via the app. At 6:30 p.m., a third motor vehicle arrives at the charging station 3, with the method proceeding in analogy to that of the second motor vehicle. In particular, on the next day, up to four motor vehicles parked on the parking spots of the charging station 3 can reach the respective desired state of charge thereof by means of the one charging station 3.

If the charging station 3 is equipped with a greater discharging power than the plugged-in motor vehicle 2 can receive in the form of recharging power, then the plugged-in motor vehicle 2 can be charged only with the maximum possible charging power of the plugged-in motor vehicle 2. In this case, the charging station 3 may not call upon the full discharging power thereof, which can lead to waiting times. In order to prevent this, it is possible by means of the switching device to distribute the discharging power of the charging station 2 between the motor vehicle 2 and the other motor vehicle 12. For this purpose, a specific exemplary embodiment will also be discussed below. At the charging station 3, which has a discharging power of 22 kW, the motor vehicle 2, which has a charging power of 11 kW, is plugged-in. The charging station 3 can output a time that the plugged-in motor vehicle 2 needs until the desired state of charge is reached and, in addition, a remaining discharging power of the charging station 3 via a display and/or via an app. Subsequently, the other motor vehicle 12 can drive up to the charging station 3 and be connected mechanically to the charging station 3. The other motor vehicle 12 can be charged with a charging power von 11 kW, which corresponds to the residual charging power of the charging station 3, until the motor vehicle 2 has reached its desired state of charge. Once the motor vehicle 2 has reached its desired state of charge, the other motor vehicle 12 has available to it the full discharging power of 22 kW of the charging station 3.

Overall, the examples show how, through the invention, an automatic unlocking of a charging arrangement comprising a motor vehicle and a charging station can be created.

The invention claimed is:

1. A method for automatic unlocking of a charging arrangement, in which an electrically drivable motor vehicle is connected to a charging station, comprising:
    automatically unlocking of a mechanical connection between the charging station and the motor vehicle as soon as a predetermined state of charge has been reached for a battery of the motor vehicle;
    generating an unlocking signal by the motor vehicle as soon as the mechanical connection has been unlocked;
    transmitting the generated unlocking signal to the charging station, which, in consequence thereof, signals that the charging station is available,
    wherein the unlocking signal is generated by the motor vehicle and transmitted from the motor vehicle to the charging station so that, after having the unlocking signal from the previously charged motor vehicle, the charging station signals, for at least one other motor vehicle, that the charging station is available, wherein the charging station provides the motor vehicle with an unlocked status signal characterizing the automatic unlocking for informing a driver of the at least one other motor vehicle, wherein the unlocked status signal is transmitted to a smart device of the driver, wherein the charging station transmits the unlocked status signal to a server device, which transmits the unlocked status signal to an app of the smart device, which, in consequence thereof, signals that the charging station is available, wherein prior to attaining the predetermined state of charge, the mechanical connection between the charging station and the motor vehicle is automatically unlocked as soon as a time interval of a valid reservation of the at least one other motor vehicle starts running, wherein the mechanical connection is automatically unlocked when, in addition to the running time interval of the valid reservation, a charge readiness signal of the at least one other motor vehicle is present, which characterizes a readiness of the at least one other motor vehicle to receive electrical energy from the charging station, and wherein if the charge readiness signal of the at least one other motor vehicle is absent after attaining the predetermined state of charge for the motor vehicle, the charging station remains unused until the at least one other motor vehicle is ready to be charged.

2. The method according to claim 1, wherein the time interval and/or the charge readiness signal is or are provided by a chip card and/or by a mobile telephone and/or by means of Bluetooth and/or by transmitted GPS data from the at least one other motor vehicle.

3. The method according to claim 1, wherein the charging station provides the motor vehicle with an unlocking command characterizing the unlocking, and the motor vehicle unlocks the mechanical connection as soon as the motor vehicle receives the unlocking command.

4. The method according to claim 1, wherein the charging station signals a time interval of the reservation.

5. The method according to claim 1, wherein a time interval and/or a starting time point of the reservation is determined by a navigation system of the at least one other motor vehicle, and the reservation is made by the navigation system.

6. The method according to claim 1, wherein by the charging station, the motor vehicle and the at least one other motor vehicle are recharged via respective charging connectors of the charging station up to a respective predetermined state of charge, wherein, by means of the charging station, a charging power of the at least one charging connector connected to the at least one other motor vehicle is changed as soon as the motor vehicle has reached the predetermined state of charge.

7. The method according to claim 6, wherein the charging power of the at least one charging connector connected to the other motor vehicle is zero as long as a state of charge of the motor vehicle lies below the predetermined state of charge.

8. The method according to claim 6, wherein a maximum charging power of the charging station is determined, and, depending on how much of the charging power the motor vehicle and the at least one other motor vehicle are ready to receive, the charging power is distributed over the charging connectors of the charging station.

9. The method according to claim 1, wherein during the automatic unlocking:
either a charging plug on the vehicle side, which is inserted into a charging socket of the charging station and is locked in place with it, is unlocked; or
a charging plug on the charging station side, which is inserted into a charging socket on the vehicle side and is locked in place with it, is unlocked.

10. The method according to claim 1, wherein the predetermined state of charge is specified depending on a user default.

11. The method according to claim 1, wherein the predetermined state of charge is a fully charged state of the battery.

12. The method according to claim 1, wherein the charging station signals by an output device that the charging station is available.

13. The method according to claim 1, wherein the motor vehicle transmits a state of charge signal, which characterizes a state of charge of the battery, to the charging station, wherein the charging station determines, as a function of the state of charge signal, a remaining charging time of the battery to reach the predetermined state of charge.

14. The method according to claim 13, wherein the charging station displays the remaining charging time of the battery by an output device.

15. The method according to claim 13, wherein the charging station transmits the remaining charging time of the battery to a server device, which transmits the remaining charging time of the battery to an app, which, in consequence thereof, outputs the remaining charging time of the battery.

* * * * *